US008660000B2

(12) United States Patent
Kruglick

(10) Patent No.: US 8,660,000 B2
(45) Date of Patent: Feb. 25, 2014

(54) ADMISSION AND EVICTION POLICIES FOR MOBILE DEVICES WITH NON-TELEPHONIC FUNCTIONALITY

(75) Inventor: Ezekiel Kruglick, Poway, CA (US)

(73) Assignee: Empire Technology Development LLC, Wilmington, DE (US)

( * ) Notice: Subject to any disclaimer, the term of this patent is extended or adjusted under 35 U.S.C. 154(b) by 374 days.

(21) Appl. No.: 12/999,269

(22) PCT Filed: Sep. 2, 2010

(86) PCT No.: PCT/US2010/047631
§ 371 (c)(1),
(2), (4) Date: Dec. 15, 2010

(87) PCT Pub. No.: WO2012/030342
PCT Pub. Date: Mar. 8, 2012

(65) Prior Publication Data
US 2012/0057454 A1    Mar. 8, 2012

(51) Int. Cl.
*H04L 1/00*       (2006.01)
*H04L 12/26*      (2006.01)
(52) U.S. Cl.
USPC ........................................................ 370/230
(58) Field of Classification Search
None
See application file for complete search history.

(56) References Cited

U.S. PATENT DOCUMENTS

| | | | |
|---|---|---|---|
| 6,216,006 B1 | 4/2001 | Scholefield et al. | |
| 6,631,269 B1 | 10/2003 | Cave | |
| 6,856,948 B1* | 2/2005 | Tran | 703/2 |
| 6,907,237 B1* | 6/2005 | Dorenbosch et al. | 455/404.1 |
| 6,944,457 B2* | 9/2005 | Alinikula et al. | 455/450 |
| 6,985,439 B2* | 1/2006 | Hosein | 370/230 |
| 7,120,446 B2* | 10/2006 | Iwamura et al. | 455/453 |
| 7,558,588 B2* | 7/2009 | To et al. | 455/512 |
| 7,746,787 B2* | 6/2010 | Coffman | 370/236.2 |
| 7,746,838 B2* | 6/2010 | Twitchell, Jr. | 370/338 |
| 8,036,702 B2* | 10/2011 | Etemad | 455/553.1 |
| 2002/0102986 A1 | 8/2002 | Iwamura et al. | |
| 2007/0115896 A1 | 5/2007 | To et al. | |
| 2007/0286202 A1 | 12/2007 | Dos Remedios et al. | |
| 2012/0033612 A1* | 2/2012 | Jazra | 370/328 |

OTHER PUBLICATIONS

Bartolini, et al., Call Admission Control in Wireless Multimedia Networks, PIMRC, IEEE, 2002.
International Search Report and Written Opinion for International Application No. PCT/US2010/047631, mailed on Nov. 10, 2010.
International Telecommunication Union, ITUT-T Recommendation I.371-AAP 74, Summary: Recommendation 1.371—Traffic control and congestion control in B ISDN, posted on Feb. 27, 2004, accessed online on Jun. 4, 2012 via http://www.itu.int/itudoc/itu-t/aap/sg13aap/history/i371/index.html.

* cited by examiner

*Primary Examiner* — Ayaz Sheikh
*Assistant Examiner* — Blanche Wong
(74) *Attorney, Agent, or Firm* — Brundidge & Stanger, P.C.

(57) ABSTRACT

Implementations and techniques for admission and/or eviction policies for wireless devices having non-telephonic functionality are generally disclosed.

10 Claims, 6 Drawing Sheets

500 A computer program product.

502 A signal bearing medium.

504 at least one of one or more instructions for receiving, from a wireless device, a request to be admitted to a wireless network;

one or more instructions for receiving source traffic information associated with the request;

one or more instructions for determining a QoS metric in response to the request and a control policy that evicts second class wireless devices from the wireless network, and based, at least in part, onthe source traffic information;

one or more instructions for determining whether admitting the wireless device to the wireless network will cause the QoS metric to exceed a threshold;

one or more instructions for denying the wireless device access to the wireless network if admitting the wireless device will cause the QoS metric to exceed the threshold;

one or more instructions for receiving an indication that the wireless device comprises a second class wireless device, wherein the indication comprises an indication generated in response to the wireless device having implemented a non-telephonic mode;

one or more instructions for determining a QoS metric; or one or more instructions for evicting the wireless device from the network if the QoS metric exceeds a threshold.

| 506 a computer-readable medium. | 508 a recordable medium. | 510 a communications medium. |

FIG. 5

ADMISSION AND EVICTION POLICIES FOR MOBILE DEVICES WITH NON-TELEPHONIC FUNCTIONALITY

BACKGROUND

Unless otherwise indicated herein, the approaches described in this section are not prior art to the claims in this application and are not admitted to be prior art by inclusion in this section.

Many factors may lead to congestion in wireless networks including excessive traffic bursting, overbooking, rerouting, ingress policing, and more. Such congestion may increase stress on both bandwidth and buffering which in turn may cause delays and increased data loss that may lead to link dropping. Furthermore, wireless networks are increasingly required to support mobile devices having non-telephonic functionality, such as mobile telephones equipped with Global Positioning System (GPS) functionality, electronic book readers, gaming consoles, and the like. Many of these devices (such as GPS trackers in particular) attempt to maintain network connections for large fractions of the time while sending relatively little data and may be expected to place increased bandwidth demands on wireless networks.

Network Connection Admission Control (CAC) policies, such as those defined by ITU-T recommendation I.371, for example, typically use calculations of effective bandwidth based on variables such as Peak Cell Rate (PCR), Sustainable Cell Rate (SCR), and Maximum Burst Size (MBS). Monitoring of such variables may be used to trade off service quality and/or admission to meet Quality of Service (QoS) targets, such as Cell Loss Ratios (CLR) or other values, which maintain a statistical estimate of the frequency of dropped connections due to over demand conditions. Typical CAC policies implement a metric such as CLR (proportional to the ratio of cell data lost to cell data received) and a target for each level of service. For example, the TM 4.0 standard defines five service categories having a range of CLR target values.

While typical network CAC policies restrict admission to a network or adjust service levels when participant conditions induce or are expected to induce Quality of Service (QoS) losses, such as CLR violations, it may be useful to have a low-impact control policy to drop less desirable connections before random traffic levels result in connection drops.

SUMMARY

Processes and/or methods for implementing Quality of Service (QoS) in a wireless network are described including receiving a request from a wireless device to be admitted to a wireless network, receiving source traffic information associated with the request, determining a QoS metric in response to the request and based, at least in part, on the source traffic information, determining whether admitting the wireless device to the network will cause the QoS metric to exceed a threshold, and denying access to the network if admitting the device will cause the QoS metric to exceed the threshold. The QoS metric may be determined in response to a control policy that selectively evicts second class wireless devices from the wireless network. Further, QoS may be implemented on a wireless network by determining a QoS metric after receiving an indication that a wireless device admitted the network is a second class wireless device, and evicting the wireless device from the network if the QoS metric exceeds a threshold.

In addition, systems and/or devices are described including base station logic configured to receive a request from a wireless device to be admitted to a wireless network, receive source traffic information associated with the request, determine a QoS metric in response to the request and based, at least in part, on the source traffic information, determine whether admitting the wireless device to the network will cause the QoS metric to exceed a threshold, and deny access to the network if admitting the device will cause the QoS metric to exceed the threshold. The base station logic may be configured to determine the QoS metric in response to a control policy that selectively evicts second class wireless devices from the wireless network.

In addition, articles are described including computer program product having instructions that, if executed, result in receiving a request from a wireless device to be admitted to a wireless network, receiving source traffic information associated with the request, determining a QoS metric in response to the request and based, at least in part, on the source traffic information, determining whether admitting the wireless device to the network will cause the QoS metric to exceed a threshold, and denying access to the network if admitting the device will cause the QoS metric to exceed the threshold. The QoS metric may be determined in response to a control policy that selectively evicts second class wireless devices from the wireless network.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The subject matter of the present disclosure is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings:

FIG. 5 is an illustration of an example computer program product; and

DETAILED DESCRIPTION

Figure 1:
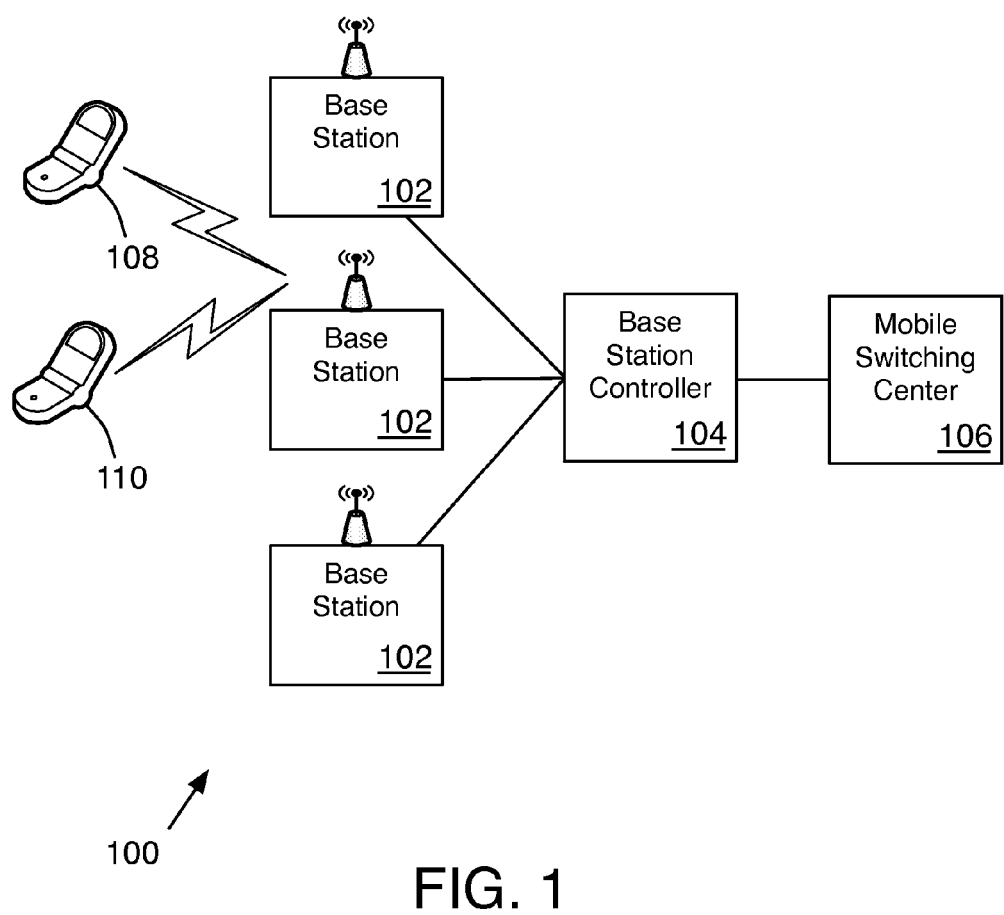
FIG. 1 is an illustrative diagram of a portion of an example wireless network.

The following description sets forth various examples along with specific details to provide a thorough understanding of claimed subject matter. It will be understood by those skilled in the art, however, that claimed subject matter may be practiced without some or more of the specific details disclosed herein. Further, in some circumstances, well-known methods, procedures, systems, components and/or circuits have not been described in detail in order to avoid unnecessarily obscuring claimed subject matter. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the embodiments of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatus, and systems related to admission and eviction policy for mobile devices with non-telephonic functionality.

In a wireless network, control of the admission and/or eviction of a mobile device may be undertaken when it is determined that network Quality of Service (QoS), as measured, for example, by a suitable metric such as Cellular Loss Ratio (CLR), may be substantially impacted if the device is allowed access to the network or if the device is allowed to remain connected to the network. In accordance with the present disclosure, mobile devices possessing non-telephonic functionalities, such as, for example, wireless Global Positioning System (GPS) devices, wireless game consoles, etc., may be assigned a secondary classification subordinate to other mobile devices, such as cellular telephones, so that mobile devices with non-telephonic functionality may be evicted from a network.

Further, in accordance with the present disclosure, mobile devices with non-telephonic functionality may be assigned secondary classification based on information associated with a given mobile device that is either seeking access to a network or that is already connected on a network. For example, non-phone devices with non-urgent functions may be designated as "second class" devices and may be blocked from admission to a network or evicted from a network during times of network congestion. When a network channel becomes loaded such that a random drop becomes likely, a control policy including an eviction policy in accordance with the present disclosure may allow for dropping a second class device such as a non-phone device or a device employing non-telephonic functionality to recover call loss margin. Thus, a network system operated in accordance with the present disclosure may continue to admit additional users as long as it may be determined that the CLR, for example, can be improved by dropping some or all second class devices.

FIG. 1 illustrates a portion of an example wireless network 100 in accordance with at least some embodiments of the present disclosure. Network 100 may include one or more base stations 102, a base station controller 104, a mobile switching center 106, a wireless device exchanging telephonic data and/or information with one of base stations 102, and a wireless device 110 exchanging non-telephonic data and/or information with one of base stations 102. Device 110 may include non-telephonic functionality such as, for example, GPS functionality, internet browser functionality, networked gaming functionality, etc., that may be considered subordinate to telephonic functionality provided by network 100.

In some examples, device 108 may be a cellular telephone exchanging telephonic data over network 100, while device 110 may be a GPS navigational device acquiring non-telephonic data, such as navigational data or HyperText Markup Language (HTML) data, over network 100. In some examples, while devices 108 and 110 may be similar mobile devices, such as cellular telephones, device 108 may be engaged in making a telephone call over network 100, while device 110 may have been switched into a non-telephonic mode, such as a GPS mode, and may be engaged in a non-telephonic activity, such as acquiring navigational data, over network 100.

In accordance with the present disclosure, device 110 may be assigned to a secondary class status while device 108 may be assigned to a primary class status based on the device type and/or service type. Once classified, device 108 may be admitted to network 100 and/or retained on network 100 while other devices, having secondary class status may be treated differently. For example, device 110, having been assigned to a secondary class status, may be excluded from network 100 and/or may be evicted or dropped from network 100 while device 108 may be admitted or retained. Moreover, a determination of whether or not a device, regardless of classification, may be admitted to network 100 may be undertaken based on a control policy that allows for the eviction of second class devices already on network 100.

Network 100 is presented herein purely for illustrative purposes and it may be recognized that a wireless network may have additional components that have not been depicted in FIG. 1 in the interest of clarity. While the example implementation of network 100 may be employed for the purposes of discussion herein as being compliant, at least in part, with ITU-T recommendation I.371, claimed subject matter is not limited in this regard and may be implemented in the context of any form of mobile telephony network including, to name several examples, an Asynchronous Transfer Mode (ATM) network, a Time Division Multiplexing (TDM) network, a Multiprotocol Label Switching (MPLS) network, a packet-switched network such as an Transmission Control Protocol Internet Protocol (TCP/IP) network, etc.

Figure 2:
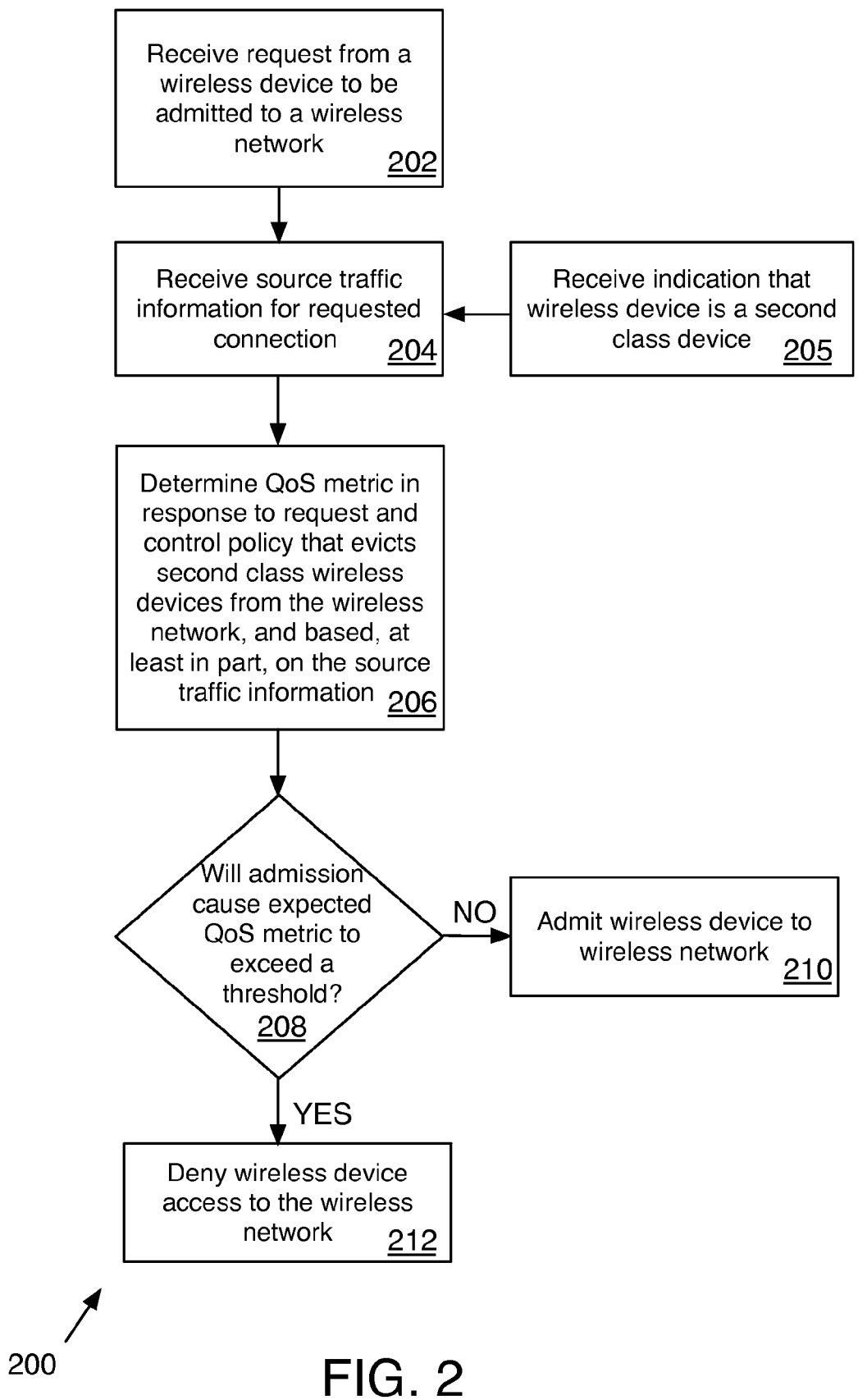
FIG. 2 is a flow chart of an example process.

FIG. 2 illustrates a flow diagram of a process 200 for implementing an admission policy for mobile devices having non-telephonic functionality according to various implementations of the present disclosure. In some examples, referring also to FIG. 1, process 200 may represent portions of restriction logic that may be implemented at or by a network base station, such as any of base stations 102, and/or at or by a base station controller, such as controller 104. Process 200 may include one or more operations, functions or actions as illustrated by one or more of blocks 202, 204, 205, 206, 208, 210 and/or 212. Process 200 may begin at block 202. During the discussion of FIG. 2 that follows, various aspects of network 100 of FIG. 1 may be used to illustrate certain portions of process 200. Such examples, however, should be considered non-limiting.

In block 202, a wireless network may receive a request from a wireless device to be admitted to the network. For example, a base station 102 of network 100 may receive a request from device 110 to connect to network 100. At block 204, source traffic information related to the device requesting access in block 202 may be received. For example, in some implementations, source traffic information such as one or more source traffic parameter values including PCR, SCR and/or MBS values may be received in block 204 where a base station and/or base station controller may have generated the source traffic information.

At block 205, the wireless network may receive an indication that the wireless device is a second class device. In some examples, a second class device may be a wireless device that includes non-telephonic functionality such as a computing device, a Global Positioning System (GPS) device, an electronic book device, and/or a game consoles, to name several examples. In various implementations, non-telephonic functionality may include the ability to use the wireless network to obtain non-telephonic or non-voice data such as navigational data, video data, audio data, and/or internet data obtained through a browser application, to name several examples.

In some implementations, the second class indication received in block 205 may have been generated in response to the wireless device having implemented a non-telephonic mode such as a navigational mode, a video mode, a browser mode, and/or an audio mode. In various implementations, the indication of second class status received in block 205 may be conveyed to a wireless network within header information contained in request data received along with the request in block 202. In some implementations, the indication of second class status received in block 205 may be obtained from profile information associated with the wireless device requesting access in block 202. Alternatively, in some implementations, information indicating second class status may be obtained in block 205 by using known techniques to extract traffic characteristics from a data stream sent by a device requesting access in block 202.

At block 206 a determination may be made of a QoS metric in response to the request received in block 202, and a control policy that evicts second class wireless devices from the wireless network, and also based on the source traffic information received in block 204. For example, in various implementations, a base station 102 or base station controller 104 may undertake block 206 assuming that second class devices may be dropped from the wireless network if subsequent network congestion warrants doing so. In various examples, block 206 may include determining one or more of a CLR metric, a Cell Transfer Delay (CTD) metric, a Cell Delay Variation (CDV) metric, to name a few examples.

In block 208, a base station 102 or base station controller 104 may compare the QoS metric determined in block 206 to a threshold, and, if the QoS metric does not exceed the threshold then the wireless device may be admitted to the network (block 210), otherwise, if the QoS metric exceeds the threshold then the wireless device may be denied access to the network (block 212). For example, a base station 102 or base station controller 104 may compare, in block 208, a CLR metric determined in block 206 to a threshold CLR and may undertake either of blocks 210 or 212 based on that comparison.

Figure 3:
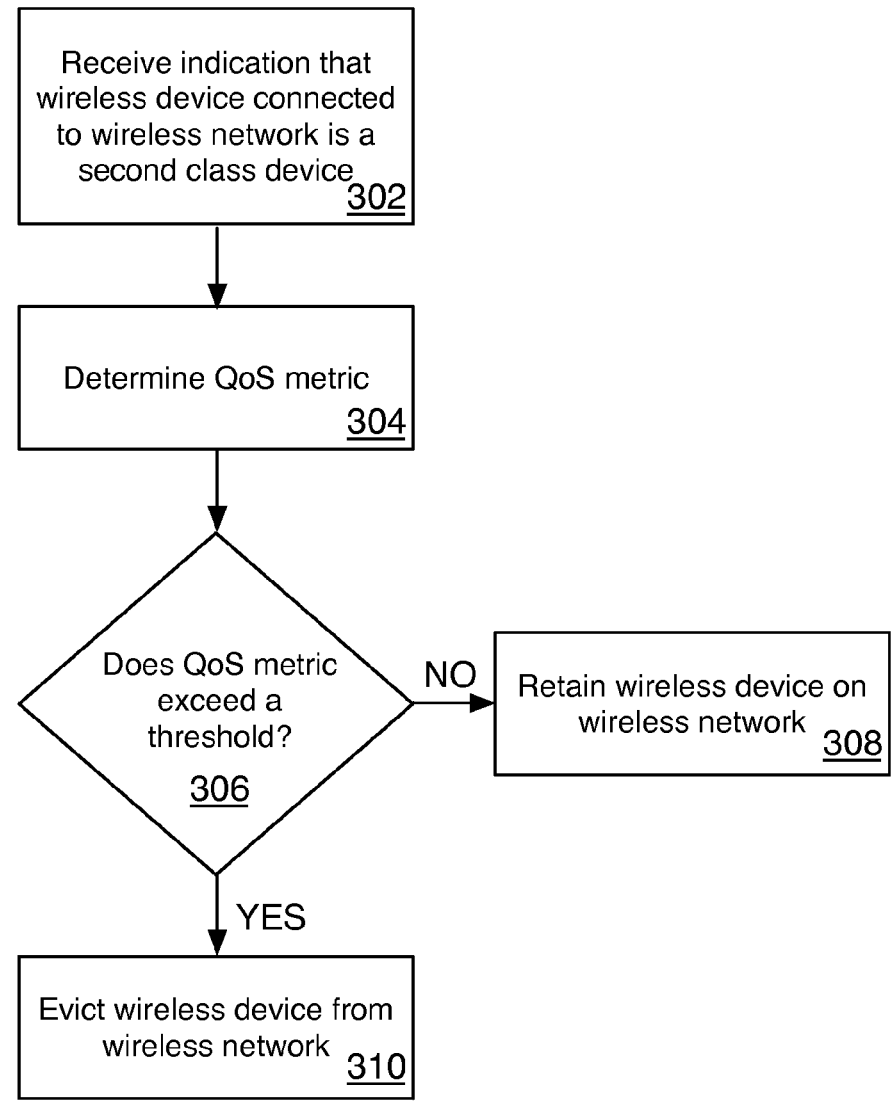
FIG. 3 is a flow chart of an example process.

FIG. 3 illustrates a flow diagram of a process 300 for implementing an eviction policy for mobile devices having non-telephonic functionality according to various implementations of the present disclosure. In some examples, referring also to FIG. 1, process 300 may represent portions of eviction logic that may be implemented at or by a network base station, such as any of base stations 102, and/or at or by a base station controller, such as controller 104. Process 300 may include one or more operations, functions or actions as illustrated by one or more of blocks 302, 304, 306, 308 and/or 310. Process 300 may begin at block 302. During the discussion of FIG. 3 that follows, various aspects of network 100 of FIG. 1 may be used to illustrate certain aspects of process 300. Such examples, however, should be considered non-limiting.

In block 302, a wireless network may receive an indication that a wireless device connected to the network has second class status. For example, as described above in process 200, a base station 102 of network 100 may have received an indication that device 110 has second class status when device 110 requested access to network 100. At block 304 portions of the wireless network may determine one or more QoS metrics. In some examples, block 304 may include determining one or more of CLR, CTD, and/or CDV QoS metrics.

At block 306, a determination may be made as to whether or not the QoS metric exceeds a threshold. For example, a base station 102 or base station controller 104 may compare the QoS metric determined in block 304 to a threshold to undertake block 306. Subsequently, if block 306 results in the determination that the QoS metric does not exceed a threshold then the wireless device having second class status may be retained or allowed to remain connected to the network in block 308. Otherwise, if block 306 results in the determination that the QoS metric exceeds a threshold then the wireless device having second class status may be evicted or disconnected from the network in block 310. For example, a network management layer implemented, at least in part, at a base station, such as one of base stations 102, and/or at a base station controller, such as base station controller 104 may evict a second class device at block 310 with the goal of improving QoS by reducing the number of devices connected to the network.

Processes 200 and 300 set forth various functional blocks or actions that may be described as processing steps, functional operations, events and/or acts, etc. Those skilled in the art in light of the present disclosure will recognize that numerous alternatives to the functional blocks shown in FIGS. 2 and 3 may be practiced in various implementations. For example, although process 200, as shown in FIG. 2 includes one particular order of blocks or actions, the order in which these blocks or actions are presented does not necessarily limit the claimed subject matter to any particular order. Likewise, intervening actions not shown in FIGS. 2 and 3 and/or additional actions not shown in FIGS. 2 and 3 may be employed and/or some of the actions shown in FIGS. 2 and 3 may be eliminated, without departing from the scope of the claimed subject matter.

Figure 4:
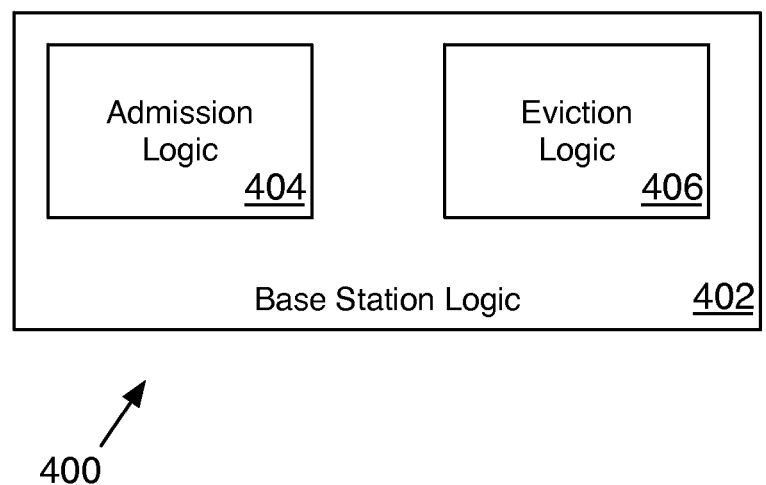
FIG. 4 is an illustrative diagram of an example system.

FIG. 4 illustrates an example apparatus or system 400 for admission and/or eviction policies for mobile devices having non-telephonic functionality in accordance with at least some implementations of the present disclosure. With reference to FIGS. 2 and 3, system 400 may include a base station logic module 402 including an admission or restriction logic module 404 that may be configured to undertake any of blocks 202, 204, 206, 208, 210 and/or 212 of process 200. Base station logic module 402 may also include an eviction logic module 406 that may be configured to undertake any of blocks 302, 304, 306, 308 and/or 310 of process 300.

Modules 402, 404 and/or 406 may be implemented any combination of hardware, software, and/or firmware. For example, one or more of modules 402, 404 and/or 406 of system 400 may be implemented, at least in part, in software and/or firmware stored in computer readable media and executed by a microprocessor or Central Processing Unit (CPU), an Application Specific Integrated Circuit (ASIC), a Field Programmable Gate Array (FPGA), a digital signal processor (DSP), or other integrated formats. Furthermore, one or more of modules 402, 404 and/or 406 of system 400 may be implemented in a base station and/or a base station controller.

FIG. 5 illustrates an example computer program product 500 arranged in accordance with the present disclosure. Program product 500 may include a signal bearing medium 502. Signal bearing medium 502 may include one or more instructions 504 that, when executed by, for example, a processor, may provide the functionality described above with respect to FIGS. 2 and 3. Thus, for example, referring to the system of FIG. 4, base station logic 402 may undertake one or more of the blocks shown in FIGS. 2 and 3 in response to instructions 504 conveyed by medium 502.

In some implementations, signal bearing medium 502 may encompass a computer-readable medium 506, such as, but not limited to, a hard disk drive, a Compact Disc (CD), a Digital Versatile Disk (DVD), a digital tape, memory, etc. In some implementations, signal bearing medium 502 may encompass a recordable medium 508, such as, but not limited to, memory, read/write (R/W) CDs, R/W DVDs, etc. In some implementations, signal bearing medium 502 may encompass a communications medium 510, such as, but not limited to, a digital and/or an analog communication medium (e.g., a fiber optic cable, a waveguide, a wired communications link, a wireless communication link, etc.). Thus, for example, referring to the system of FIG. 4, program product 500 may be wirelessly conveyed to system 400 by signal bearing medium 502, where signal bearing medium 502 may be conveyed to system 400 by a wireless communications medium 510 (e.g., an wireless communications medium conforming with the 802.11 standard).

Figure 6:
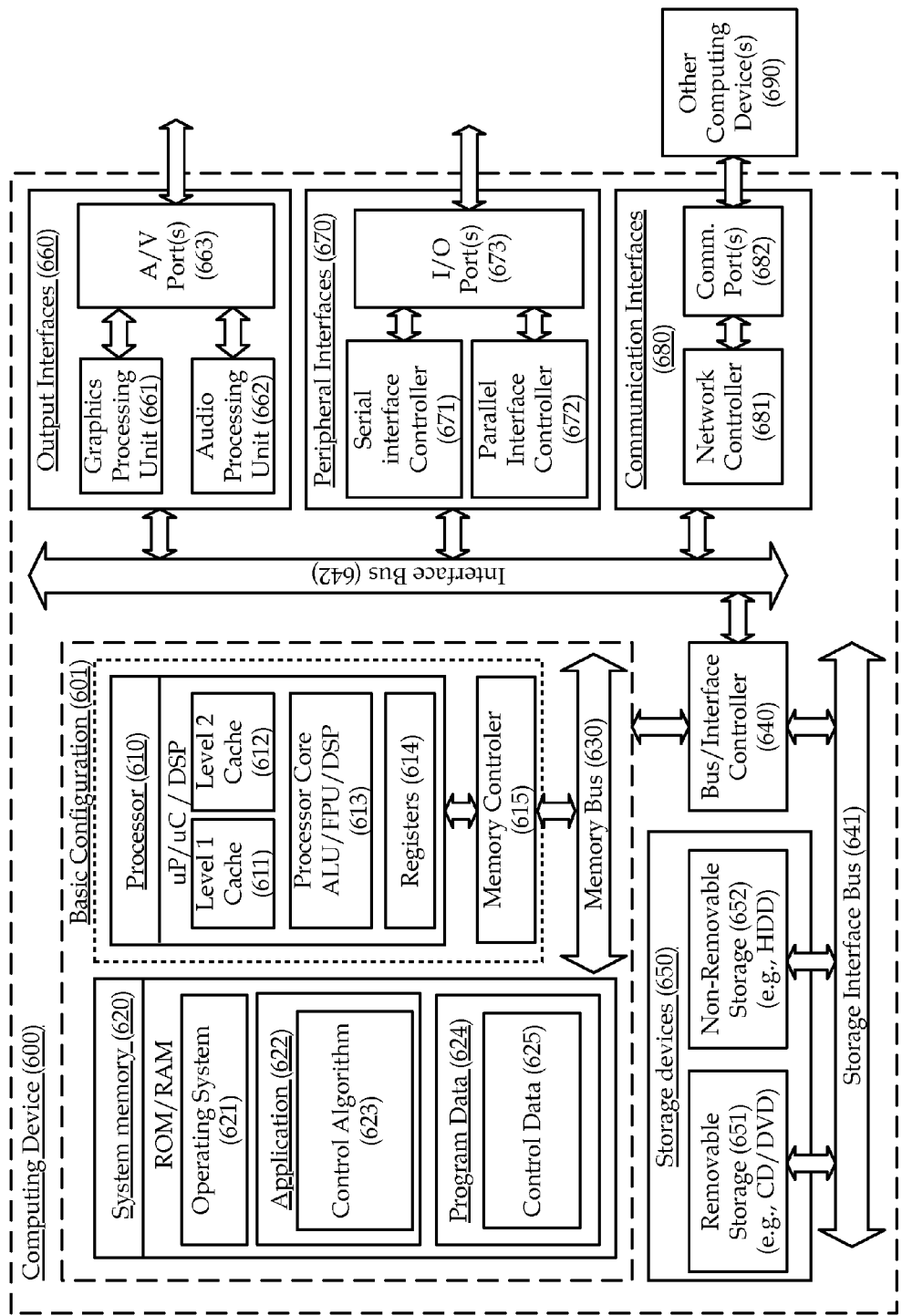
FIG. 6 is an illustration of an example computing device, all arranged in accordance with at least some embodiments of the present disclosure.

FIG. 6 is a block diagram illustrating an example computing device 600. In some examples, implementation of admission and/or eviction policies for wireless devices having non-telephonic functionality may be provided by computing device 600. In a very basic configuration 601, computing device 600 typically includes one or more processors 610 and system memory 620. A memory bus 630 can be used for communicating between the processor 610 and the system memory 620.

Depending on the desired configuration, the system memory 620 can be of any type including but not limited to volatile memory (such as RAM), non-volatile memory (such as ROM, flash memory, etc.) or any combination thereof. System memory 620 typically includes an operating system 621, one or more applications 622, and program data 624. Application 622 includes instructions 623 that are arranged to perform the functions as described herein including the actions described with respect to the flow charts shown in FIGS. 2 and 3. Program Data 624 includes control data 625 that may be useful for implementing instructions 623. In some examples, application 622 can be arranged to operate with program data 624 on an operating system 621 such that implementations of admission and/or eviction policies for wireless devices having non-telephonic functionality, as described herein, may be provided. This described basic configuration is illustrated in FIG. 6 by those components within dashed line 601.

Computing device 600 can have additional features or functionality, and additional interfaces to facilitate communications between the basic configuration 601 and any required devices and interfaces. For example, a bus/interface controller 640 can be used to facilitate communications between the basic configuration 601 and one or more data storage devices 650 via a storage interface bus 641. The data storage devices 650 can be removable storage devices 651, non-removable storage devices 652, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory 620, removable storage 651 and non-removable storage 652 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media can be part of device 600.

Computing device 600 can also include an interface bus 642 for facilitating communication from various interface devices (e.g., output interfaces, peripheral interfaces, and communication interfaces) to the basic configuration 601 via the bus/interface controller 640. Example output interfaces 660 include a graphics processing unit 661 and an audio processing unit 662, which can be configured to communicate to various external devices such as a display or speakers via one or more A/V ports 663. Example peripheral interfaces 660 include a serial interface controller 671 or a parallel interface controller 672, which can be configured to communicate with external devices such as input devices (e.g., keyboard, mouse, pen, voice input device, touch input device, etc.) or other peripheral devices (e.g., printer, scanner, etc.) via one or more I/O ports 673. An example communication interface 680 includes a network controller 681, which can be arranged to facilitate communications with one or more other computing devices 690 over a network communication via one or more communication ports 682. A network communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 600 can be implemented as a portion of a small-form factor portable (or mobile) electronic device such as a cell phone, smart phone, a personal data assistant (PDA), a personal media player device, a wireless web-watch device, a personal headset device, an application specific device, or a hybrid device that include any of the above functions. Computing device 600 can also be implemented as a personal computer including both laptop computer and non-laptop computer configurations or implemented in a workstation or a server configuration. For example, referring to network 100 of FIG. 1, computing system 600 may be implemented as part of any one of base stations 102 and/or as part of base station controller 104.

References made in this disclosure to the term "responsive to" or "in response to" are not limited to responsiveness to only a particular feature and/or structure. A feature may also be responsive to another feature and/or structure and also be located within that feature and/or structure. Moreover, when terms or phrases such as "coupled" or "responsive" or "in response to" or "in communication with", etc. are used herein or in the claims that follow, these terms should be interpreted broadly. For example, the phrase "coupled to" may refer to being communicatively, electrically and/or operatively coupled as appropriate for the context in which the phrase is used.

Some portions of the foregoing detailed description are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing device, that manipulates or transforms data represented as physical electronic or magnetic quantities within memories, registers, or other information storage devices, transmission devices, or display devices of the computing device.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a flexible disk, a hard disk drive (HDD), a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It should also be understood that, the term "optimize" may include maximization and/or minimization. The term "minimization" and/or the like as used herein may include a global minimum, a local minimum, an approximate global minimum, and/or an approximate local minimum. Likewise, it should also be understood that, the term "maximization" and/or the like as used herein may include an global maximum, a local maximum, an approximate global maximum, and/or an approximate local maximum.

Reference in the specification to "an implementation," "one implementation," "some implementations," or "other implementations" may mean that a particular feature, structure, or characteristic described in connection with one or more implementations may be included in at least some implementations, but not necessarily in all implementations. The various appearances of "an implementation," "one implementation," or "some implementations" in the preceding description are not necessarily all referring to the same implementations.

While certain example techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

What is claimed:

1. A method for implementing Quality of Service (QoS) in a wireless network, comprising:
    receiving, from a wireless device, a request to be admitted to the wireless network;
    receiving source traffic information associated with the request, the source traffic information including an indication that the wireless device comprises a non-phone wireless device with non-urgent functions;
    determining, in response to the request, a QoS metric in response to a control policy that evicts non-phone wireless devices with non-urgent functions from the wireless network, the QoS based, at least in part, on the source traffic information;
    determining whether admitting the wireless device to the wireless network will cause the QoS metric to exceed a threshold; and
    denying the wireless device access to the wireless network if admitting the wireless device will cause the QoS metric to exceed the threshold.

2. The method of claim 1, wherein the non-phone wireless device with non-urgent functions comprises at least one of a navigational device, a video device, a browser device, or an audio device.

3. The method of claim 1, wherein the non-phone wireless device with non-urgent functions comprises at least one of a computing device, a Global Positioning System (GPS) device, an electronic book device, or a game console.

4. The method of claim 1, wherein the QoS metric comprises at least one of a Cell Loss Ratio (CLR), a Cell Transfer Delay (CTD), or a Cell Delay Variation (CDV).

5. The method of claim 1, wherein the source traffic information comprises at least one of Peak Cell Rate (PCR), Sustainable Cell Rate (SCR), or Maximum Burst Size (MBS).

6. A wireless network system, comprising:
    an antenna;
    one or more processors; and
    a non-transitory signal bearing medium having instructions stored therein, which, when executed, cause the one or more processors to:
        receive, from a wireless device, a request to be admitted to a wireless network;
        receive source traffic information associated with the request, the source traffic information including an indication that the wireless device comprises a non-phone wireless device with non-urgent functions;
        determine a QoS metric in response to the request and based, at least in part, on the source traffic information;
        determine whether admitting the wireless device to the wireless
        network will cause the QoS metric to exceed a threshold; and
        deny the wireless device access to the wireless network if admitting the wireless device will cause the QoS metric to exceed the threshold,
        wherein determining the QoS metric comprises determining the QoS metric in response to a control policy that evicts non-phone wireless devices with non-urgent functions from the wireless network.

7. The system of claim 6, wherein the non-phone wireless device with non-urgent functions comprises one of a computing device, a Global Positioning System (GPS) device, an electronic book device, or a game console.

8. A computer program product comprising a non-transitory signal bearing medium having stored therein instructions that, if executed, cause one or more processors to perform operations comprising:
- receiving, from a wireless device, a request to be admitted to a wireless network;
- receiving source traffic information associated with the request, the source traffic information including an indication that the wireless device comprises a non-phone wireless device with non-urgent functions;
- determining, in response to the request, a QoS metric in response to a control policy that evicts non-phone wireless devices with non-urgent functions from the wireless network, the QoS based, at least in part, on the source traffic information;
- determining whether admitting the wireless device to the wireless network will cause the QoS metric to exceed a threshold; and
- denying the wireless device access to the wireless network if admitting the wireless device will cause the QoS metric to exceed the threshold.

9. The computer program product of claim 8, wherein the non-phone wireless device with non-urgent functions comprises at least one of a navigational device, a video device, a browser device, or an audio device.

10. The computer program product of claim 8, wherein the non-phone wireless device with non-urgent functions comprises at least one of a computing device, a Global Positioning System (GPS) device, an electronic book device, or a game console.

* * * * *